United States Patent
Kuang et al.

(10) Patent No.: US 12,512,029 B1
(45) Date of Patent: Dec. 30, 2025

(54) GATE DRIVING CIRCUIT WITH REDUCED OUTPUT DELAY, DISPLAY PANEL AND DISPLAY DEVICE HAVING GATE DRIVING CIRCUIT WITH REDUCED OUTPUT DELAY

(71) Applicant: Xiamen Tianma Display Technology Co., Ltd., Xiamen (CN)

(72) Inventors: Jian Kuang, Xiamen (CN); Xingyao Zhou, Xiamen (CN); Yana Gao, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/930,143

(22) Filed: Oct. 29, 2024

(30) Foreign Application Priority Data

Aug. 29, 2024 (CN) ......................... 202411204594.8

(51) Int. Cl.
*G09G 3/20* (2006.01)
*G11C 19/28* (2006.01)

(52) U.S. Cl.
CPC ............ *G09G 3/20* (2013.01); *G11C 19/287* (2013.01); *G09G 2310/0267* (2013.01); *G09G 2310/0286* (2013.01); *G09G 2330/02* (2013.01)

(58) Field of Classification Search
CPC ................... G09G 3/20; G09G 3/3266; G09G 2310/0267; G09G 2310/0286; G09G 2330/02; G11C 19/28

See application file for complete search history.

(56) References Cited

U.S. PATENT DOCUMENTS

| | | | |
|---|---|---|---|
| 2020/0302870 A1* | 9/2020 | Jang | G09G 3/3266 |
| 2021/0074215 A1* | 3/2021 | Park | G09G 3/3266 |
| 2021/0366402 A1* | 11/2021 | In | G09G 3/3266 |
| 2023/0252933 A1* | 8/2023 | Guo | G09G 3/3266 |
| | | | 345/55 |

FOREIGN PATENT DOCUMENTS

| | | |
|---|---|---|
| CN | 112687230 A | 4/2021 |
| CN | 115631711 A | 1/2023 |

* cited by examiner

*Primary Examiner* — Adam J Snyder
(74) *Attorney, Agent, or Firm* — Anova Law Group, PLLC (57) ABSTRACT

Gate driving circuit, display panel and display device are provided. The gate driving circuit includes a plurality of cascaded shift registers. A shift register of the plurality of shift registers includes an input module, a node control module, a first coupling module, a second coupling module and an output module. The input module is configured to adjust potentials of a first node and a second node. The node control module is configured to adjust potentials of a third node and a fourth node. The first coupling module includes a first switch unit and a first capacitor. The second coupling module includes a second capacitor placed between, and connected to, the fourth node and a shift output end. The output module is configured to control a signal at the shift output end. A capacitance of the second capacitor differs from a capacitance of the first capacitor.

18 Claims, 7 Drawing Sheets

GATE DRIVING CIRCUIT WITH REDUCED OUTPUT DELAY, DISPLAY PANEL AND DISPLAY DEVICE HAVING GATE DRIVING CIRCUIT WITH REDUCED OUTPUT DELAY

CROSS-REFERENCE TO RELATED APPLICATION

This application claims priority of Chinese Patent Application No. 2024112045948, filed on Aug. 29, 2024, the entire contents of which are hereby incorporated by reference.

FIELD OF THE DISCLOSURE

The present disclosure generally relates to the field of display technology and, more particularly, relates to a gate driving circuit, a display panel and a display device.

BACKGROUND

In a display panel, a driving circuit arranged in a non-display area is an indispensable circuit structure, which is configured for realizing display, touch and other functions of the display panel.

The driving circuit is usually composed of a plurality of cascaded shift registers. A driving chip provides a driving signal to each shift register in the driving circuit through a signal line to enable the driving circuit to operate normally.

However, some existing display panels experience abnormal outputs from the driving circuit, which affects a display effect.

BRIEF SUMMARY OF THE DISCLOSURE

One aspect of the present disclosure provides a gate driving circuit. The gate driving circuit includes a plurality of cascaded shift registers. A shift register of the plurality of shift registers includes an input module, a node control module, a first coupling module, a second coupling module and an output module. The input module is respectively connected to a first power supply end, a first clock end, a trigger signal end, a first node and a second node, and is configured to adjust potentials of the first node and the second node. The node control module is respectively connected to the first node, the second node, the first power supply end, a second power supply end, the first clock end, a second clock end, a third node and a fourth node, and is configured to adjust potentials of the third node and the fourth node. The first coupling module includes a first switch unit and a first capacitor, the first switch unit is respectively connected to the second clock end, the second power end and a fifth node, and the first capacitor is placed between, and connected to, the fifth node and the fourth node. The second coupling module includes a second capacitor placed between, and connected to, the fourth node and a shift output end. The output module is respectively connected to the third node, the fourth node, the first power supply end, the second power supply end and the shift output end and is configured to control a signal at the shift output end. A capacitance of the second capacitor differs from a capacitance of the first capacitor.

Another aspect of the present disclosure provides a display panel including a gate driving circuit. The gate driving circuit includes a plurality of cascaded shift registers. A shift register of the plurality of shift registers includes an input module, a node control module, a first coupling module, a second coupling module and an output module. The input module is respectively connected to a first power supply end, a first clock end, a trigger signal end, a first node and a second node, and is configured to adjust potentials of the first node and the second node. The node control module is respectively connected to the first node, the second node, the first power supply end, a second power supply end, the first clock end, a second clock end, a third node and a fourth node, and is configured to adjust potentials of the third node and the fourth node. The first coupling module includes a first switch unit and a first capacitor, the first switch unit is respectively connected to the second clock end, the second power end and a fifth node, and the first capacitor is placed between, and connected to, the fifth node and the fourth node. The second coupling module includes a second capacitor placed between, and connected to, the fourth node and a shift output end. The output module is respectively connected to the third node, the fourth node, the first power supply end, the second power supply end and the shift output end and is configured to control a signal at the shift output end. A capacitance of the second capacitor differs from a capacitance of the first capacitor.

Another aspect of the present disclosure provides a display device including a display panel. The display panel includes a gate driving circuit. The gate driving circuit includes a plurality of cascaded shift registers. A shift register of the plurality of shift registers includes an input module, a node control module, a first coupling module, a second coupling module and an output module. The input module is respectively connected to a first power supply end, a first clock end, a trigger signal end, a first node and a second node, and is configured to adjust potentials of the first node and the second node. The node control module is respectively connected to the first node, the second node, the first power supply end, a second power supply end, the first clock end, a second clock end, a third node and a fourth node, and is configured to adjust potentials of the third node and the fourth node. The first coupling module includes a first switch unit and a first capacitor, the first switch unit is respectively connected to the second clock end, the second power end and a fifth node, and the first capacitor is placed between, and connected to, the fifth node and the fourth node. The second coupling module includes a second capacitor placed between, and connected to, the fourth node and a shift output end. The output module is respectively connected to the third node, the fourth node, the first power supply end, the second power supply end and the shift output end and is configured to control a signal at the shift output end. A capacitance of the second capacitor differs from a capacitance of the first capacitor.

Other aspects of the present disclosure can be understood by a person skilled in the art in light of the description, the claims, and accompanying drawings of the present disclosure.

BRIEF DESCRIPTION OF THE DRAWINGS

To more clearly illustrate technical solutions in embodiments of the present disclosure, the accompanying drawings used in the description of the embodiments will be briefly introduced below. Obviously, the accompanying drawings described below are only some embodiments of the present disclosure. A person skilled in the art can derive other drawings based on the accompanying drawings without creative efforts.

DETAILED DESCRIPTION

To enable a person skilled in the art to better understand a scheme of the present disclosure, technical solutions in the embodiments of the present disclosure will be clearly and completely described below, in conjunction with the accompanying drawings. Obviously, the described embodiments are only a part, not all, of the embodiments of the present disclosure. Based on the embodiments of the present disclosure, all other embodiments derived by a person skilled in the art without creative efforts fall within the protection scope of the present disclosure.

It should be noted that terms "first", "second" and the like in the present specification and claims of the present disclosure and the above-mentioned drawings are used to distinguish similar objects and are not necessarily used to describe a specific order or sequence. It should be understood that number used so can be interchanged under appropriate circumstances, so that the embodiments of the present disclosure described herein can be practiced in sequences other than the illustrated or described herein. Furthermore, terms "including" and "having" and any variations thereof, are intended to cover non-exclusive inclusions, for example, a process, method, system, product or device that includes a series of steps or units is not necessarily limited to the steps or units expressly listed but may include other steps or units not expressly listed or inherent to the process, method, product or device.

Figure 1:
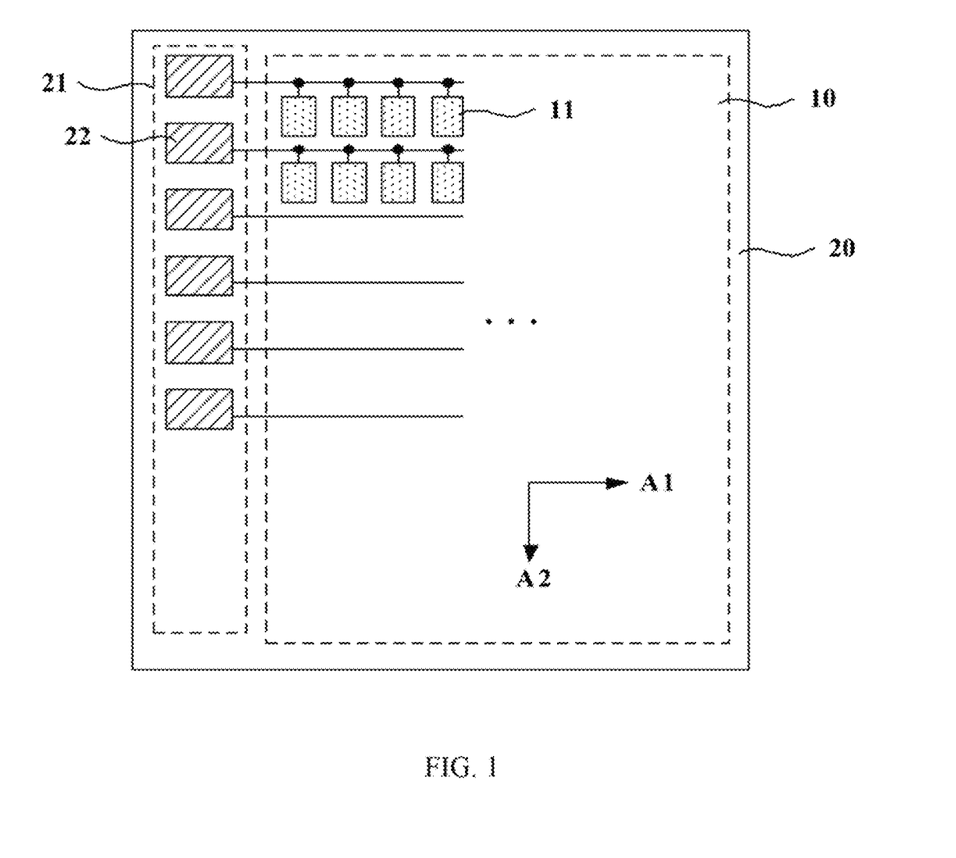
FIG. 1 illustrates a schematic diagram of a display panel consistent with various embodiments of the present disclosure.

A display panel, including a gate driving circuit, is provided in one embodiment. FIG. 1 illustrates a schematic diagram of a display panel consistent with various embodiments of the present disclosure. As shown in FIG. 1, the display panel includes a gate driving circuit 21. Specifically, the display panel includes a first area 10 and a second area 20. Optionally, the first area 10 is a display area of the display panel, and the second area 20 is a non-display area of the display panel.

The first area 10 is configured for display and includes a plurality of sub-pixels 11. Optionally, the plurality of sub-pixels 11 in the first area 10 is arranged in an array, where the plurality of sub-pixels 11 are arranged along a first direction A1 to form a row, and along a second direction A2 to form a column. The first direction A1 intersects the second direction A2. The plurality of sub-pixels 11 in the first area 10 can be arranged in various configurations, not limited to the above array arrangement. The plurality of sub-pixels 11 in the display area may be organic light-emitting display units, micro-light-emitting diode display units, or other types of sub-pixels, without specific limitation.

The second area 20 includes a circuit structure for driving the plurality of sub-pixels 11 in the first area 10 for display. Specifically, the second area 20 includes at least one gate driving circuit 21, and the gate driving circuit 21 includes a plurality of cascaded shift registers 22. The gate driving circuit 21 is configured to drive the plurality of sub-pixels 11 in the first area 10 for display. A first-level shift register 22 can drive one or more rows of sub-pixels 11 in the first area 10 for display.

The display panel can be applied to terminal devices such as smartphones, car displays, tablet computers, laptops, ultra-mobile personal computers, netbooks, smart wearable devices, augmented reality (AR) or virtual reality (VR) devices, and the like.

Figure 2:
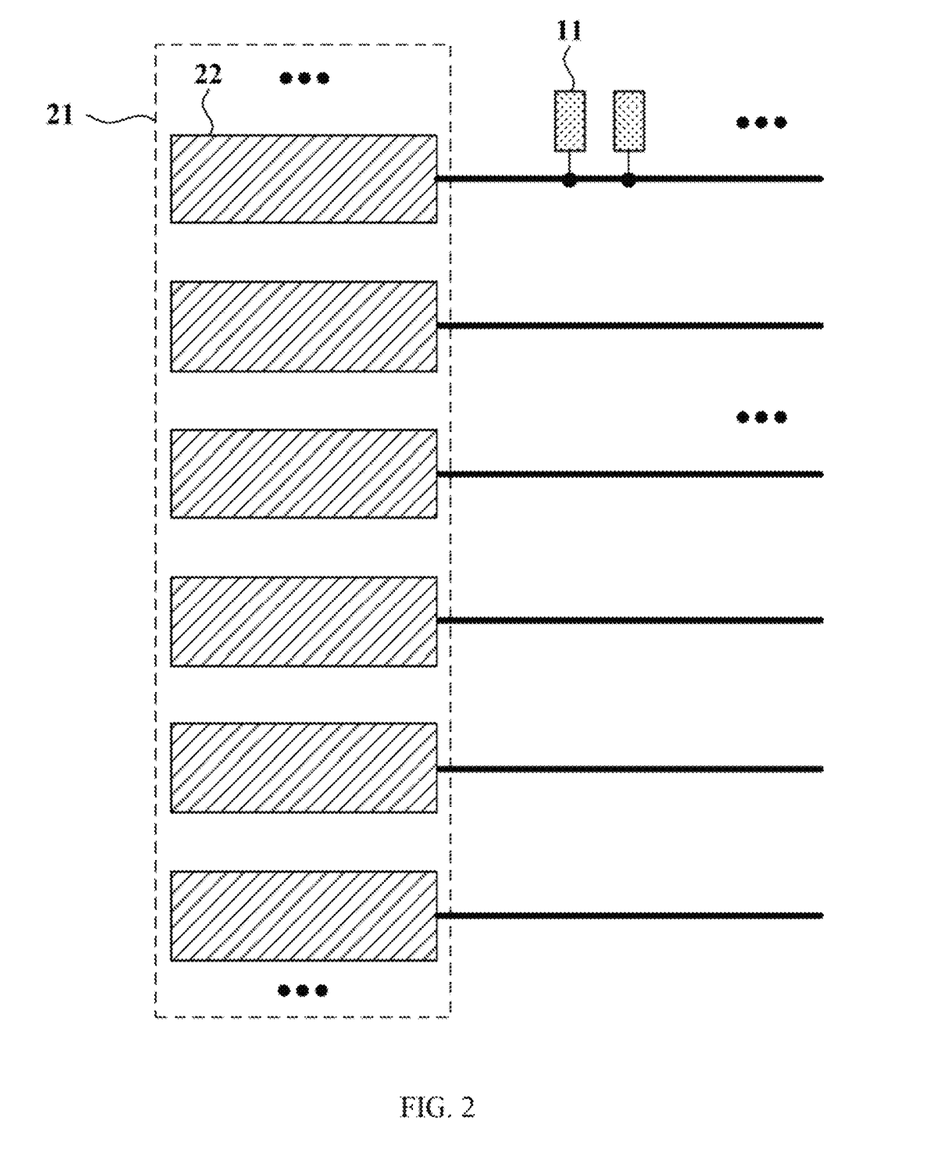
FIG. 2 illustrates a schematic diagram of a gate driving circuit consistent with various embodiments of the present disclosure.

In one embodiment, a gate driving circuit is provided. FIG. 2 illustrates a schematic diagram of a gate driving circuit consistent with various embodiments of the present disclosure. As shown in FIG. 2, the gate driving circuit 21 includes a plurality of cascaded shift registers 22.

The first-level shift register 22 may be selected to drive one or more rows of sub-pixels 11. A shift output end of the first-level shift register 22 may be connected to one or more rows of sub-pixels 11 to provide gate drive signals to the one or more rows of sub-pixels 11. Optionally, in FIG. 2, the first-stage shift register 22 is electrically connected to a row of sub-pixels 11, providing a gate driving signal to the row. However, in other embodiments, a first-level shift register may be electrically connected to a plurality of rows of sub-pixels, and providing gate drive signals to the plurality of rows of sub-pixels simultaneously.

Optionally, the trigger signal end of the nth stage shift register can be connected to a shift output end of a (n−m)-th stage shift register, where m and n are positive integers with m≥1 and n≥2.

Figure 3:
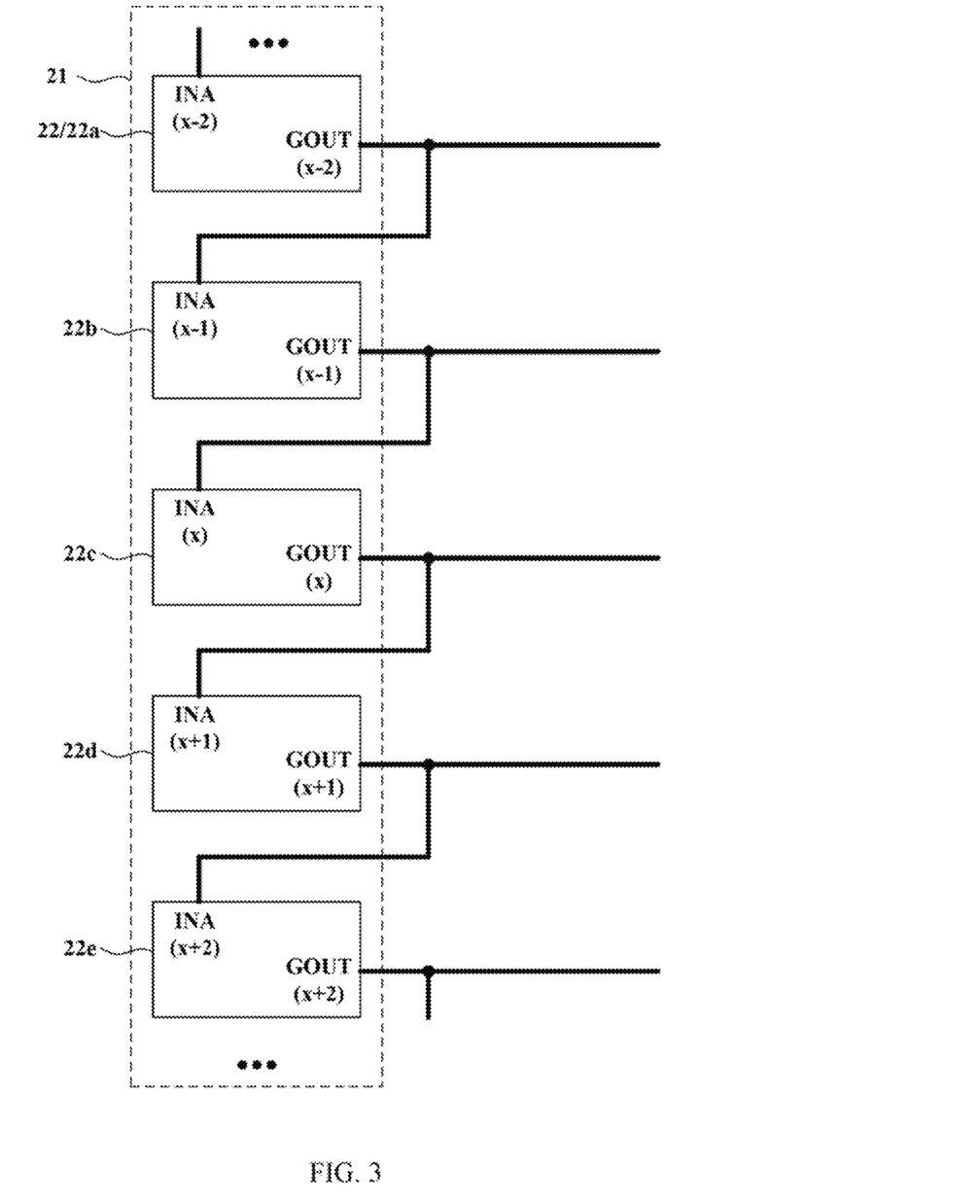
FIG. 3 illustrates a schematic diagram of another gate driving circuit consistent with various embodiments of the present disclosure.

FIG. 3 illustrates a schematic diagram of another gate driving circuit consistent with various embodiments of the present disclosure. As shown in FIG. 3, with m=1, the gate driving circuit 21 includes a plurality of cascaded shift registers 22, and the shift output end of the shift register 22 is not only connected to a corresponding row or rows of sub-pixels, but also connected to a trigger signal end of the shift register 22 at a next stage. The shift output end of the shift register 22 is labeled GOUT, and the trigger signal end of the shift register 22 is labeled INA.

Specifically, the gate driving circuit 21 includes at least an (x−2)-th stage shift register 22a, an (x−1)-th stage shift register 22b, an x-th stage shift register 22c, an (x+1)-th stage shift register 22d and an (x+2)-th stage shift register 22e. A connection relationship is as follows: a shift output end GOUT(x−2) of the (x−2)-th stage shift register 22a is connected to a corresponding row or rows of sub-pixels, and is also connected to a trigger signal end INA(x−1) of the (x−1)-th stage shift register 22b. Sequentially, the shift output end GOUT(x−1) of the (x−1)-th stage shift register 22b is connected to a corresponding row or rows of sub-pixels, and is also connected to the trigger signal end INA(x) of the x-th stage shift register 22c. Sequentially, a shift output end GOUT(x) of the x-th stage shift register 22*c* is connected to a corresponding row or rows of sub-pixels, and is also connected to a trigger signal end INA(x+1) of the (x+1)-th stage shift register 22*d*. Sequentially, a shift output end GOUT(x+1) of the (x+1)-th stage shift register 22*d* is connected to a corresponding row or rows of sub-pixels, and is also connected to a trigger signal end INA(x+2) of the (x+2)-th stage shift register 22*e*, and so on.

It can be understood that a signal at a trigger signal end of a first stage shift register can come from a driver chip, or from a shift output end of a dummy shift register arranged before the first stage shift register. A signal at a shift output end of a last stage shift register can be transmitted to a driving chip or to a trigger signal end of a dummy shift register arranged after the last stage shift register.

In other embodiments, a trigger signal end of a n-th stage shift register may be connected to the shift output end of the (n−m)-th stage shift register. Here, m may be greater than 1, allowing for connections that are not limited to adjacent shift register units. Instead, the shift registers may be cascaded every m stages, with m equal to 2, 4, 6, or other values, as a cascade relationship is specifically set according to requirements. It should be noted that, although a cascade end and the shift output end in FIG. 3 are a same terminal, in other embodiments e, the cascade end and the shift output end may be independent ends.

It can be understood signals at trigger signal ends of the 1st to m-th shift registers can come from driver chips or shift output ends of m dummy shift registers. Signals at the shift output ends of last m stage shift registers can be transmitted to driver chips or trigger signal ends of m dummy shift registers.

Figure 4:
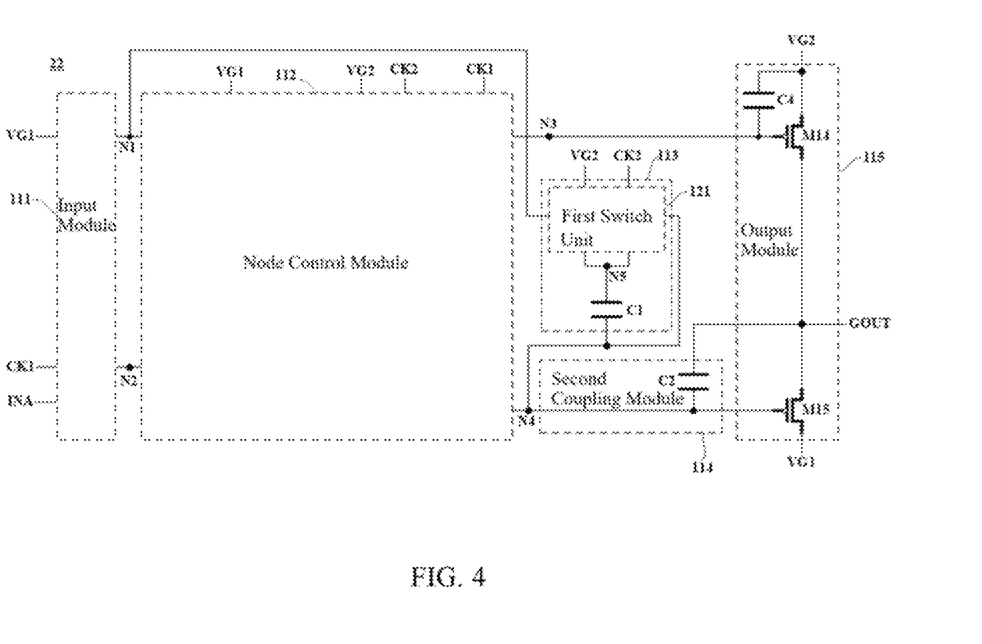
FIG. 4 illustrates a schematic diagram of a shift register consistent with various embodiments of the present disclosure.

In one embodiment, a shift register used in a gate driving circuit according to any embodiment of the present disclosure is provided. FIG. 4 illustrates a schematic diagram of a shift register consistent with various embodiments of the present disclosure. As shown in FIG. 4, the shift register 22 includes: an input module 111, a node control module 112, a first coupling module 113, a second coupling module 114 and an output module 115. The input module 111 is respectively connected to a first power supply end VG1, a first clock end CK1, the trigger signal end INA, a first node N1 and a second node N2. The input module 111 is configured to adjust potentials of the first node N1 and the second node N2. The node control module 112 is respectively connected to the first node N1, the second node N2, the first power supply end VG1, a second power supply end VG2, the first clock end CK1, a second clock end CK2, a third node N3 and a fourth node N4. The node control module 112 is configured to adjust potentials of the third node N3 and the fourth node N4. The first coupling module 113 includes a first switch unit 121 and a first capacitor C1, the first switch unit 121 is connected to the second clock end CK2, the second power end VG2 and the fifth node N5 respectively, and the first capacitor C1 is placed between, and connected to, the fifth node N5 and the fourth node N4. The second coupling module 114 includes a second capacitor C2, and the second capacitor C2 is placed between, and connected to, the fourth node N4 and the shift output end GOUT. The output module 115 is respectively connected to the third node N3, the fourth node N4, the first power supply end VG1, the second power supply end VG2 and the shift output end GOUT. The output module 115 is configured to control signals at the shift output end GOUT. A capacitance of the second capacitor C2 differs from a capacitance of the first capacitor C1.

In one embodiment, the shift register 22 includes an input module 111. The input module 111 is respectively connected to the first power supply end VG1, the first clock end CK1, the trigger signal end INA, the first node N1 and the second node N2. The first power supply end VG1 provides a first power supply signal, the first clock end CK1 provides a first clock signal, and the trigger signal end INA provides a first trigger signal. The first power supply signal can be a fixed voltage signal, the first clock signal can be a clock signal with alternating high and low levels, and the first trigger signal can be an electrical signal with alternating high and low levels. The input module 111 controls potentials of the first node N1 and the second node N2 based on the first power signal, the first clock signal and the first trigger signal, so that a potential of the first node N1 may transition from a high level to a low level, or a potential of the second node N2 may transition from a high level to a low level.

The shift register 22 includes a node control module 112. The node control module 112 is respectively connected to the first node N1, the second node N2, the first power supply end VG1, the second power supply end VG2, the first clock end CK1, the second clock end CK2, the third node N3 and the fourth node N4. The second power supply end VG2 provides a second power supply signal, and the second clock end CK2 provides a second clock signal. A second power supply signal can be a fixed voltage signal different from the first power supply signal. A second clock signal is a clock signal with alternating high and low levels and differs from the first clock signal. The node control module 112 controls potentials of the third node N3 and the fourth node N4 based on the potential of the first node N1, the potential of the second node N2, the first power signal, the second power signal, the first clock signal, and the second clock signal, so that a potential of the third node N3 may transition from a high level to a low level, or a potential of the fourth node N4 may transition from a high level to a low level.

The shift register 22 includes a first coupling module 113, which consists of a first switch unit 121 and a first capacitor C1. Two input ends of the first switch unit 121 are respectively connected to the second clock end CK2 and the second power supply end VG2. An output end of the first switch unit 121 is connected to the fifth node N5. The first capacitor C1 is placed between, and connected to, the fifth node N5 and the fourth node N4. A working state of the first switch unit 121 toggles between on and off. If the first switch unit 121 is on, a second clock signal or a second power signal can be written into the fifth node N5, causing a high-low level transition that affects the potential of the fourth node N4 through a coupling of the first capacitor C1, so that the potential of the fourth node N4 may transition high-low level. If the first switch unit 121 is off, the fifth node N5 is floating.

A first control end of the optional first switch unit 121 is connected to the first node N1. A second control end of the optional first switch unit 121 is connected to the fourth node N4, the first input end is connected to the second power end VG2, and the second input terminal is connected to the second clock end CK2, and the output end of the first switch unit 121 is connected to the fifth node N5. In one embodiment, the potential of the first node N1 controls an on-off state of a transmission path between the second power supply end VG2 and the fifth node N5. If the potential of the first node N1 turns on the transmission path, a second power signal of the second power supply end VG2 is written into the fifth node N5. The potential of the fourth node N4 controls an on-off state of a transmission path between the second clock end CK2 and the fifth node N5. If the potential of the fourth node N4 turns on the transmission path, a second clock signal of the second clock end CK2 is written into the fifth node N5. A high-low level transition of the second clock signal will also cause the potential of the fifth node N5 to transition between high and low levels.

The shift register 22 includes a second coupling module 114, which consists of a second capacitor C2 placed between, and connected to, the fourth node N4 and the shift output end GOUT. The high-low level transition of the shift output end GOUT may affect the potential of the fourth node N4 through a coupling of the second capacitor C2.

The shift register 22 includes an output module 115, which is respectively connected to the third node N3, the fourth node N4, the first power supply end VG1, the second power supply end VG2 and the shift output end GOUT. Potentials of the third node N3 and the fourth node N4 control an on-off state of the output module 115. If the output module 115 is turned on, either the first power supply signal or the second power supply signal can be written to the shift output end GOUT.

As shown in FIG. 4, optionally, the output module 115 includes a fourteenth transistor M14, a fifteenth transistor M15 and a fourth capacitor C4. A gate of the fourteenth transistor M14 is connected to the third node N3, and the fourteenth transistor M14 is placed between, and connected to, the second power supply end VG2 and the shift output end GOUT. The fourth capacitor C4 is placed between, and connected to, the third node N3 and the second power supply end VG2. A gate of the fifteenth transistor M15 is connected to the shift output end GOUT through the second capacitor C2, and the fifteenth transistor M15 is placed between, and connected to, the first power supply end VG1 and the shift output end GOUT. In one embodiment, both the fourteenth transistor M14 and the fifteenth transistor M15 can be PMOS; the first power supply signal can be a low level signal, and the second power supply signal can be a high level signal. In other embodiments, to ensure the shift register operates normally, at least one of the fourteenth transistor and the fifteenth transistor can be designed to be NMOS. One of the first power signal and the second power signal is a low level signal, and the other is a high level signal.

In one embodiment, the capacitance of the second capacitor C2 is designed to be different from the capacitance of the first capacitor C1, which can improve an output stability of the shift register and reduce an output delay of the shift register.

Figure 5:
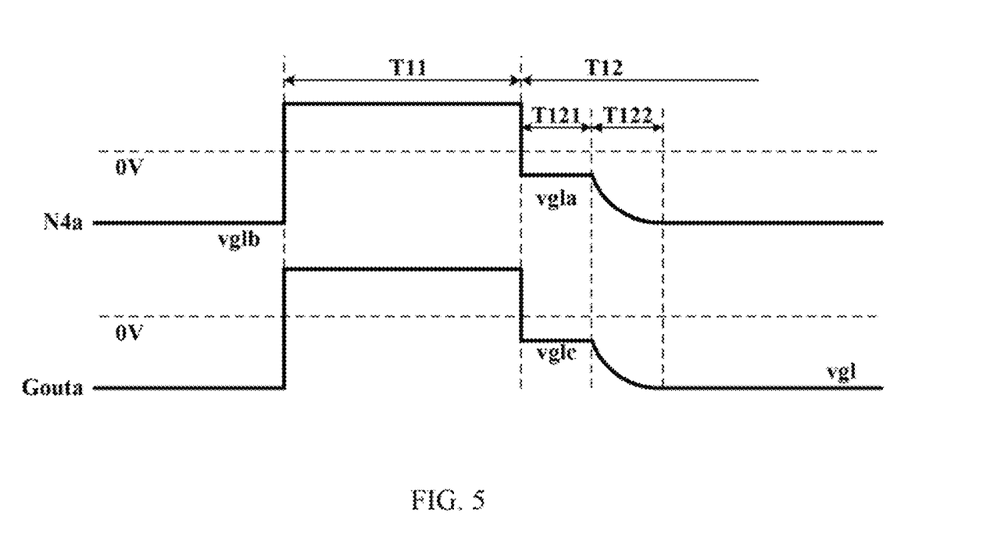
FIG. 5 illustrate a waveform diagram of an output signal based on the shift register shown in FIG. 4.

FIG. 5 is a waveform diagram of an output signal based on the shift register structure shown in FIG. 4. The capacitance of the optional second capacitor C2 in the shift register 22 is equal to the capacitance of the first capacitor C1. Signal N4a is the output signal of the fourth node N4 of the shift register 22, and Gouta is an output signal of the shift output end GOUT of the shift register 22.

Figure 6:
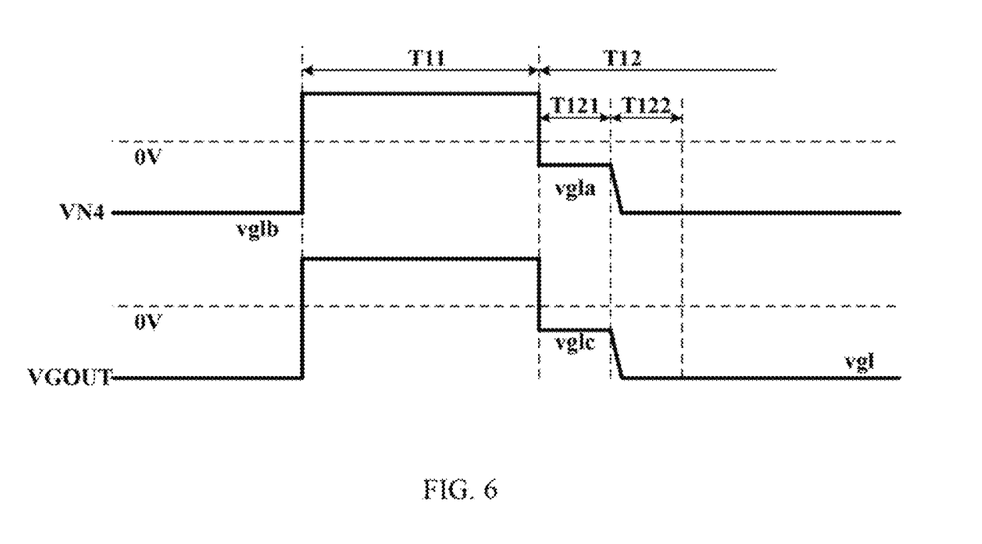
FIG. 6 illustrate a waveform diagram of another output signal based on the shift register shown in FIG. 4.

FIG. 6 illustrates a waveform diagram of another output signal based on the shift register shown in FIG. 4. Optionally, in the shift register 22, the second capacitor C2 has a capacitance different from the capacitance of the first capacitor C1. VN4 represents an output signal of the fourth node N4 of the shift register 22, and VGOUT represents the output signal of the shift output end GOUT of the shift register 2

With reference to FIGS. 4-6, an operation process of the shift register 22 includes a first output stage T11 and a second output stage T12.

In the first output stage T11, the potential of the third node N3 is low, turning on the fourteenth transistor M14, while the potential of the fourth node N4 is high, turning off the fifteenth transistor M15. A high-level signal from the second power supply end VG2 is written into the shift output end GOUT through the fourteenth transistor M14, resulting in a high-level output signal at the shift output end GOUT.

In the second output stage T12, the potential of the third node N3 is high, turning off the fourteenth transistor M14, while the potential of the fourth node N4 is low, turning on the fifteenth transistor M15. A low-level signal from the first power supply end VG1 is transmitted to the shift output end GOUT through the fifteenth transistor M15, resulting in a low-level output signal at the shift output end GOUT.

In a T121 stage of the second output stage T12, due to a transmission loss between the input module 111 and the node control module 112, the potential of the fourth node N4 drops to a low voltage vgla, which is greater than a low voltage vglb. A first power signal vgl, provided by the first power end VG1 can only pull down the output signal of the shift output end GOUT to a low voltage vglc through the fifteenth transistor M15, and the low voltage vglc is greater than the low voltage vgl.

With reference to FIG. 5, when the capacitance of the second capacitor C2 is equal to the capacitance of the first capacitor C1, in a T122 stage of the second output stage T12, the potential of the fifth node N5 transitions from a high level to a low level, and the potential N4a of the fourth node N4 is pulled down due to coupling by the first capacitor C1. Since the capacitance of the second capacitor C2 is equal to the capacitance of the first capacitor C1, the potential N4a of the fourth node N4 is also affected by a coupling of the second capacitor C2, so that the potential N4a of the fourth node N4 decreases slowly. Specifically, the potential N4a of the fourth node N4 is gradually pulled down from the low voltage vgla to the low voltage vglb after a period of T122. Accordingly, the first power signal vgl continuously pulls down an output signal at the shift output end GOUT through the fifteenth transistor M15, so that an output signal Gouta of the shift output end GOUT gradually drops from the low voltage vglc to the low voltage vgl. Under an influence of negative drift of a threshold voltage Vth of a transistor, the output signal Gouta of the shift output end GOUT may not drop completely to vgl. As a result, the output signal Gouta exhibits delay and small steps, leading to a large falling edge in an output waveform at the shift output end GOUT. The gate driving circuit includes a multi-stage shift register. If one stage of the shift register experiences output delays and small steps, in a multi-stage connection structure, the gate driving circuit develop small steps in stage transmission, leading to output abnormalities of the gate driving circuit that can cause display issues on the panel.

Referring to FIG. 6, when the capacitance of the second capacitor C2 differs from the capacitance of the first capacitor C1, the capacitance of the second capacitor C2 can be matched to the capacitance value of the first capacitor C1 by adjusting a size of the first capacitor C1 and/or a size of the second capacitor C2, so that a charge coupled by the first capacitor C1 to the fourth node N4 can quickly reduce the potential of the fourth node N4, so that the output waveform at the shift output end GOUT can be quickly pulled down to vgl, minimizing a falling edge of the output waveform at the shift output end GOUT, preventing the output signal of the shift output end GOUT from failing to reach vgl, avoiding an abnormal output of the gate driving circuit, and improving the display effect. In the T122 stage of the second output stage T12, the potential of the fifth node N5 transitions from a high level to a low level. By adjusting the sizes of the first capacitor C1 and the second capacitor C2, the low level of the fifth node N5 can be coupled through the first capacitor C1 to quickly pull down the potential VN4 of the fourth node N4, so that the potential VN4 of the fourth node N4 can quickly drop from the low voltage vgla to the low voltage vglb. Accordingly, the first power signal vgl can make the output signal VGOUT of the shift output end GOUT drop quickly from the low voltage vglc to the low voltage vgl through the fifteenth transistor M15. Compared to the output signal Gouta, the output delay and small steps of the output signal VGOUT are reduced, effectively minimizing the falling edge of the output waveform at the shift output end GOUT, improving an output stability of the gate driving circuit and enhancing the display effect.

In the present disclosure, the gate driving circuit includes a plurality of cascaded shift registers. Each shift register contains a first coupling module and a second coupling module. The first coupling module comprises a first switch unit and a first capacitor with an output end of the first switch unit connected to the fifth node. The first capacitor is placed between, and connected to, the fifth node and the fourth node. The second coupling module includes a second capacitor placed between, and connected to, the fourth node and the shift output end with the capacitance of the second capacitor differing from the capacitance of the first capacitor. In the present disclosure, the capacitance of the second capacitor C2 in the shift register matches the capacitance of the first capacitor C1 to ensure that a charge coupled by the first capacitor to the fourth node effectively lowers the potential of the fourth node in a timely manner, thereby reducing the falling edge of the output waveform at the shift output end, preventing an abnormal output of the gate driving circuit, mitigating display abnormalities caused by small steps in a stage transmission of the gate driving circuit, and enhancing both the display effect and circuit reliability.

The above summarizes a main idea of the present disclosure. A working principle of the shift register will be explained and illustrated through a specific shift register structure.

The capacitance of the second capacitor may be greater than the capacitance of the first capacitor. Referring to FIG. 6. In the second output stage T12, the output signal VGOUT at the shift output end GOUT transitions from a high level to a low level. When the capacitance of the second capacitor C2 is greater than the capacitance of the first capacitor C1, the output signal VGOUT can quickly pull down the potential VN4 of the fourth node N4 through a coupling of the second capacitor C2, so that the potential VN4 of the fourth node N4 can quickly drop from the low voltage vgla to the low voltage vglb. Accordingly, the output signal VGOUT of the shift output end GOUT can drop quickly from the low voltage vglc to the low voltage vgl, thereby reducing the falling edge of the output waveform at the shift output end GOUT, improving the output stability of the gate driving circuit and enhancing the display effect.

Optionally, C21=a*C11, 1<a≤1.16. C21 is the capacitance of the second capacitor and C11 is the capacitance of the first capacitor. In the following, a relationship between the capacitance of the second capacitor C2 and the capacitance of the first capacitor C1 will be described based on a specific shift register structure.

The capacitance of the second capacitor may be smaller than the capacitance of the first capacitor. Referring to FIG. 6, in the T122 stage of the second output stage T12, the potential of the fifth node N5 changes from a high level to a low level. When the capacitance of the first capacitor C1 is greater than that of the second capacitor C2, the potential VN4 of the fourth node N4 can be quickly pulled down through a coupling of the first capacitor C1, so that the potential VN4 of the fourth node N4 can quickly drop from the low voltage vgla to the low voltage vglb. Accordingly, the output signal VGOUT of the shift output end GOUT can drop quickly from the low voltage vglc to the low voltage vgl, thereby reducing the falling edge of the output waveform at the shift output end GOUT, improving the output stability of the gate driving circuit and enhancing the display effect.

Optionally, C21=b*C11, 0<b≤0.5. C21 is the capacitance of the second capacitor and C11 is the capacitance of the first capacitor. In the following, a relationship between the capacitance of the second capacitor C2 and the capacitance of the first capacitor C1 will be described based on a specific shift register structure.

In one embodiment, the size of the first capacitor C1 and/or the size of the second capacitor C2 is adjusted so that the capacitance of the second capacitor C2 matches the capacitance of the first capacitor C1, so that the charge coupled by the first capacitor C1 to the fourth node N4 can timely pull down the potential of the fourth node N4. As a result, the output waveform at the shift output end GOUT is quickly pulled down to the low voltage vgl, reducing the falling edge of the output waveform at the shift output end GOUT, preventing the output signal of the shift output end GOUT from falling to reach vgl, avoiding an abnormal output of the gate driving circuit, and improving the display effect.

Figure 7:
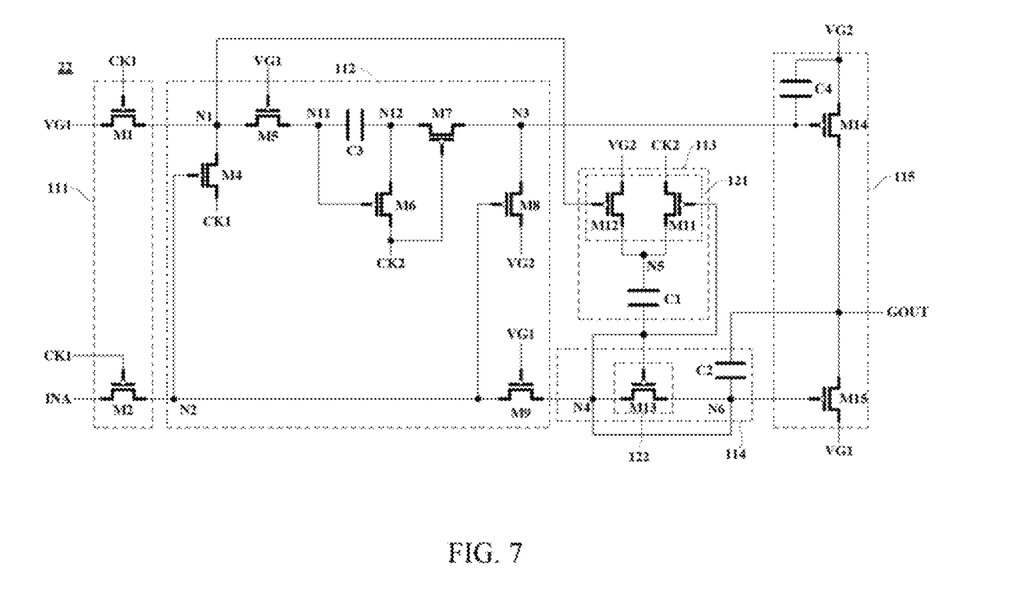
FIG. 7 illustrates a schematic diagram of another shift register consistent with various embodiments of the present disclosure.

FIG. 7 illustrates a schematic diagram of another shift register consistent with various embodiments of the present disclosure. As shown in FIG. 7, in the shift register 22, optionally, the second coupling module 114 includes a second switch unit 122, with both a control end and a input end of the second switch unit 122 connected to the fourth node N4. An output end of the second switch unit 122 is connected to the sixth node N6. The second capacitor C2 is placed between, and connected to, the sixth node N6 and the shift output end GOUT.

Optionally, the input module 111 includes a first transistor M1 and a second transistor M2. A gate of the first transistor M1 is connected to the first clock end CK1, and the first transistor M1 is placed between, and connected to, the first power supply end VG1 and the first node N1. A gate of the second transistor M2 is connected to the first clock end CK1, and the second transistor M2 is placed between, and connected to, the trigger signal end INA and the second node N2.

Optionally, the node control module 112 includes a fourth transistor M4, a fifth transistor M5, a sixth transistor M6, a seventh transistor M7, an eighth transistor M8, a ninth transistor M9 and a third capacitor C3. A gate of the fourth transistor M4 is connected to the second node N2, and the fourth transistor M4 is placed between, and connected to, the first clock end CK1 and the first node N1. A gate of the fifth transistor M5 is connected to the first power supply end VG1, and the fifth transistor M5 is placed between, and connected to, the first node N1 and a first end N11 of the third capacitor C3. A gate of the sixth transistor M6 is connected to the first end N11 of the third capacitor C3, and the sixth transistor M6 is placed between, and connected to, a second end N12 of the third capacitor C3 and the second clock end CK2. A gate of the seventh transistor M7 is connected to the second clock end CK2, and the seventh transistor M7 is placed between, and connected to, the second end N12 of the third capacitor C3 and the third node N3. A gate of the eighth transistor M8 is connected to the second node N2, and the eighth transistor M8 is placed between, and connected to, the second power supply end VG2 and the third node N3. A gate of the ninth transistor M9 is connected to the first power supply end VG1, and the ninth transistor M9 is placed between, and connected to, the second node N2 and the fourth node N4.

Optionally, the first switch unit 121 includes an eleventh transistor M11 and a twelfth transistor M12. A gate of the eleventh transistor M11 is connected to the fourth node N4, and the eleventh transistor M11 is placed between, and connected to, the second clock end CK2 and the fifth node N5. A gate of the twelfth transistor M12 is connected to the first node N1, and the twelfth transistor M12 is placed between, and connected to, the second power supply end VG2 and the fifth node N5.

Optionally, the second switch unit 122 includes a thirteenth transistor M13. A gate of the thirteenth transistor M13 is connected to the fourth node N4, and the thirteenth transistor M13 is placed between, and connected to, the fourth node N4 and a sixth node N6.

Optionally, the first clock end CK1 provides a first clock signal, while the second clock end CK2 provides a second clock signal. The first and second clock signals have opposite phases.

Figure 8:
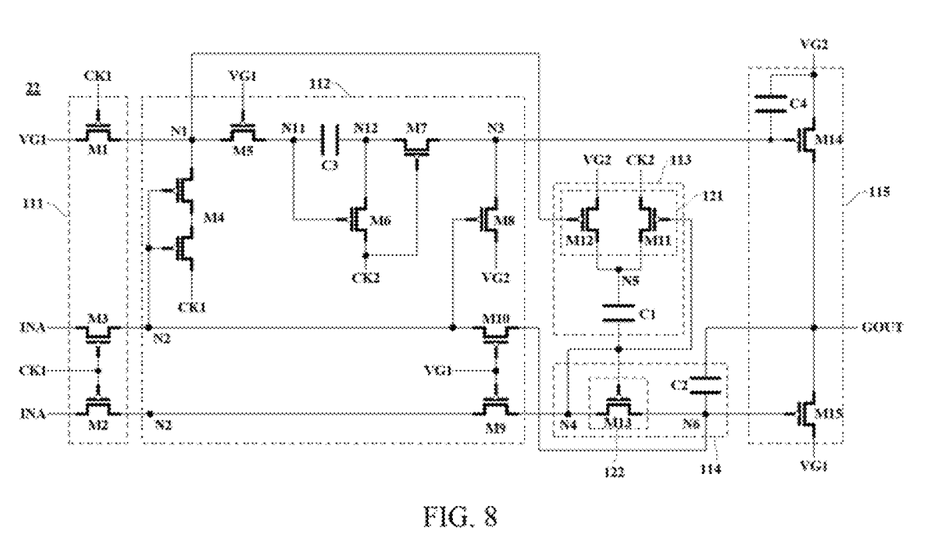
FIG. 8 illustrates a schematic diagram of another shift register consistent with various embodiments of the present disclosure.

FIG. 8 illustrates a schematic diagram of another shift register consistent with various embodiments of the present disclosure. A difference between FIG. 8 and FIG. 7 is that in the shift register 22 shown in FIG. 8, the fourth transistor M4 is optionally a dual-gate transistor. In FIG. 8, optionally, the input module 111 of the shift register 22 further includes a third transistor M3. A gate of the third transistor M3 is connected to the first clock end CK1, and the third transistor M3 is placed between, and connected to, the trigger signal end INA and the second node N2. In FIG. 8, optionally, the node control module 112 includes a tenth transistor M10. A gate of the tenth transistor M10 is connected to the first power supply end VG1, and the tenth transistor M10 is placed between, and connected to, the second node N2 and the sixth node N6. The sixth node N6 is connected to the shift output end GOUT via the second capacitor C2.

In the embodiment, optionally, transistors are all P-type transistors, which is not limited herein. Different types of transistors can be reasonably designed to ensure a normal operation of the shift register 22. In addition, a structure of the shift register 22 in the present disclosure is not limited to structures of the shift register 22 shown in FIG. 7 and FIG. 8. A person skilled in the art can select a suitable design for the shift register 22.

Figure 9:
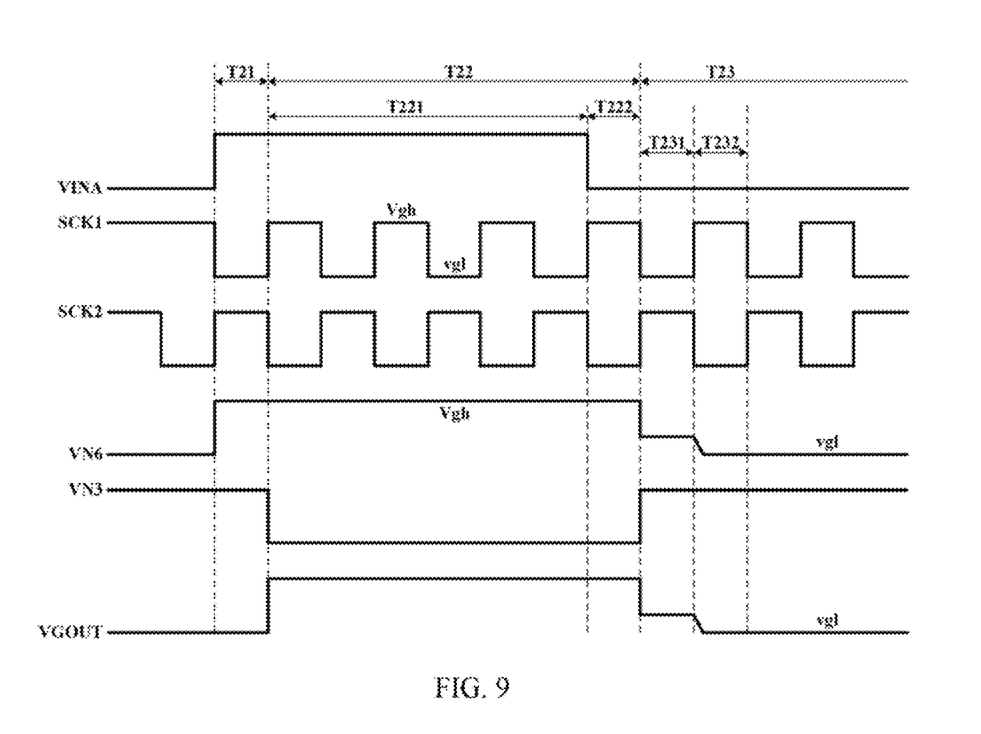
FIG. 9 illustrates a timing diagram of the shift register shown in FIG. 8.

A timing sequence is described using the shift register 22 shown in FIG. 8 as an example. FIG. 9 illustrates a timing diagram of the shift register shown in FIG. 8. As shown in FIG. 8 and FIG. 9, an operation process of the shift register 22 at least includes a first stage T21, a second stage T22 and a third stage T23. The second stage T22 consists of a first sub-stage T221 and a second sub-stage T222, and the third phase T23 comprises a third sub-stage T231 and a fourth sub-stage T232. The first stage T21 is an input phase, the second stage T22 is a first output phase, and the third phase T23 is a second output phase.

Optionally, the first power supply signal from the first power supply end VG1 is a low voltage, while the second power supply signal from the second power supply end VG2 is a high voltage. The first trigger signal from the trigger signal end INA is VINA, the first clock signal from the first clock end CK1 is SCK1, the second clock signal from by the second clock end CK2 is SCK2, the potential of the third node N3 is VN3, the potential of the sixth node N6 is VN6, and a signal at the shift output end GOUT is VGOUT.

In the first stage T21, the first trigger signal VINA is at a high level, the first clock signal SCK1 is at a low level, and the second clock signal SCK2 is at a high level. The first transistor M1 is turned on to make the first node N1 at a low level. The second transistor M2 and the third transistor M3 are both turned on to make the second node N2 at a high level. The fourth transistor M4 is turned off, while the fifth transistor M5 is turned on to make the node N11 at a low level. The sixth transistor M6 is turned on, and a high level of SCK2 is written into the node N12 to make the node N12 at a high level. Therefore, the first end N11 of the third capacitor C3 is at a low level and the second end N12 of the third capacitor C3 is at a high level, so that the third capacitor C3 can be charged. The seventh transistor M7 and the eighth transistor M8 are both turned off, while the ninth transistor M9 and the tenth transistor M10 are both turned on, so that the fourth node N4 and the sixth node N6 are both at high levels. The eleventh transistor M11 is turned off, while the twelfth transistor M12 is turned on so that the fifth node N5 is at a high level. Therefore, one end N5 of the first capacitor C1 is at a high level and the other end N4 of the first capacitor C1 is at a high level, so that the first capacitor C1 can be discharged. The thirteenth transistor M13 is turned off, the third node N3 is at a high level, the fourteenth transistor M14 is turned off, and the fifteenth transistor M15 is turned off. One end VG2 of the fourth capacitor C4 is at a high level and the third node N3 is at a high level, so that the fourth capacitor C4 can be discharged. One end N6 of the second capacitor C2 is at a high level and the other end GOUT of the second capacitor C2 is at a low level, so that the second capacitor C2 can be charged. The shift output end GOUT output a low level.

In the first sub-stage T221 of the second stage T22, the first trigger signal VINA is at a high level, the first clock signal SCK1 undergoes a high-to-low level transition, and the second clock signal SCK2 also undergoes a high-to-low level transition. Therefore, the first node N1 is at a low level, the second node N2 is at a high level, and the fourth transistor M4 is turned off. The fifth transistor M5 is turned on to make the node N11 at a low level and the sixth transistor M6 is also turned on. In the first sub-stage T221, in a continuous cycle, SCK2 transitions from a low level to a high level, when SCK2 transitions to low level, the seventh transistor M7 is turned on, and a low level of SCK2 is written into the node N12 and the third node N3 respectively. Sequentially, SCK2 transitions to a high level, the seventh transistor M7 is turned off, and the third node N3 remains at a low level, and the continuous cycle ensures that the third node N3 remains at a low level in first sub-stage T221. The eighth transistor M8 is turned off, while both the ninth transistor M9 and the tenth transistor M10 are turned on, so that both the fourth node N4 and the sixth node N6 are at a high level. The eleventh transistor M11 is turned off, and the twelfth transistor M12 is also turned on to make the fifth node N5 at a high level. The thirteenth transistor M13 is turned off, the fifteenth transistor M15 is also turned off, while the fourteenth transistor M14 is turned on, so that the shift output end GOUT outputs a high level.

In the second sub-stage T222 of the second stage T22, the first trigger signal VINA is at a low level, the first clock signal SCK1 is also at a high level, while the second clock signal SCK2 is at a low level. The first transistor M1 is turned off, so that the first node N1 is at a low level. The second transistor M2 and the third transistor M3 are both turned off, so that the second node N2 is at a high level. The fourth transistor M4 is turned off, while the fifth transistor M5 is turned on, so that the node N11 is at a low level. The sixth transistor M6 is turned on, and with SCK2 at a low level, the seventh transistor M7 is also turned on. The low level of SCK2 is written into the node N12 and the third node N3 respectively, keeping the third node N3 at a low level. The eighth transistor M8 is turned off, while the ninth transistor M9 and the tenth transistor M10 are both turned on, so that the fourth node N4 and the sixth node N6 are both at high levels. The eleventh transistor M11 is turned off, while the twelfth transistor M12 is turned on, so that the fifth node N5 is at a high level. The thirteenth transistor M13 is turned off, the fifteenth transistor M15 is also turned off, while the fourteenth transistor M14 is turned on, so that the shift output end GOUT outputs a high level.

In the third sub-stage T231 of the third phase T23, the first trigger signal VINA is at a low level, the first clock signal SCK1 is also at a low level, while the second clock signal SCK2 is at a high level. The first transistor M1 is turned on, and the first node N1 is at a low level. The second transistor M2 and the third transistor M3 are both turned on, and the second node N2 is at a low level. The fourth transistor M4 is turned on, the fifth transistor M5 is also turned on, and a low level of SCK1 is written into the first node N1 and the node N11 respectively. The sixth transistor M6 is turned on, and the node N12 is at a high level. The seventh transistor M7 is turned off, while the eighth transistor M8 is turned on, and the third node N3 transitions to a high level. The ninth transistor M9 and the tenth transistor M10 are both turned on, so that the fourth node N4 and the sixth node N6 are both at low levels. The eleventh transistor M11 is turned on, and the twelfth transistor M12 is turned on, so that the fifth node N5 is at a high level. The thirteenth transistor M13 and the fifteenth transistor M15 are both turned on, while the fourteenth transistor M14 is turned off, so that the shift output end GOUT outputs a low level. In the sub-stage T231, due to a transmission loss between the input module 111 and the node control module 112, the potential of the sixth node N6 drops to the low voltage vgla, which is greater than the low voltage vglb. The first power signal vgl from by the first power end VG1 can only pull down the output signal VGOUT of the shift output end GOUT to the low voltage vglc through the fifteenth transistor M15, and the low voltage vglc is greater than the low voltage vgl.

In the fourth sub-stage T232 of the third phase T23, the first trigger signal VINA is at a low level, the first clock signal SCK1 is at a high level, and the second clock signal SCK2 is at a low level. The first transistor M1, the second transistor M2 and the third transistor M3 are all turned off, and the second node N2 is at a low level. The fourth transistor M4 is turned on, the fifth transistor M5 is also turned on, and a high level of SCK1 is written into the first node N1 and the node N11 respectively. The sixth transistor M6 is turned off, the seventh transistor M7 is turned on, the eighth transistor M8 is turned on, the high level of VG2 is written into the third node N3, and the third node N3 is at a high level. The ninth transistor M9 and the tenth transistor M10 are both turned on, so that the fourth node N4 and the sixth node N6 are both at low levels. The eleventh transistor M11 is turned on, while the twelfth transistor M12 is turned off, the low level of SCK2 is written into the fifth node N5, and the fifth node N5 is at a low level. The thirteenth transistor M13 is turned on, the fourteenth transistor M14 is turned off, the fifteenth transistor M15 is turned on, so that the shift output end GOUT outputs a low level. In the sub-stage T232, the potential of the fifth node N5 transitions to a low level. By adjusting the size of the first capacitor C1 and the size of the second capacitor C2, a low level of the fifth node N5 can be coupled by the first capacitor C1 to quickly pull down the potential VN6 of the sixth node N6, so that the potential VN6 of the sixth node N6 can quickly drop from the low voltage vgla to the low voltage vglb. Accordingly, the first power signal vgl can make the output signal VGOUT of the shift output end GOUT drop quickly from the low voltage vglc to the low voltage vgl through the fifteenth transistor M15. Obviously, the output delay and small steps of the output signal VGOUT are reduced, so that the falling edge of the output waveform at the shift output end GOUT is effectively reduced, thereby improving the output stability of the gate driving circuit and enhancing the display effect.

Optionally, in one embodiment, C21=a*C11, 1<a≤1.16. C21 is the capacitance of the second capacitor and C11 is the capacitance of the first capacitor. 1<a≤1.16, then 1*C11<a*C11≤1.16*C11, which means C11<C21≤1.16*C11. Therefore, the capacitance C21 of the second capacitor C2 is greater than the capacitance C11 of the first capacitor C1, and less than or equal to 1.16 times the capacitance C11 of the first capacitor C1.

Optionally, in one embodiment, C21=b*C11, 0<b≤0.5. C21 is the capacitance of the second capacitor and C11 is the capacitance of the first capacitor. 0<b≤0.5, then 0*C11<b*C11≤0.5*C11, which means C21≤0.5*C11. Therefore, the capacitance C21 of the second capacitor C2 is greater than 0, and less than or equal to 0.5 times the capacitance C11 of the first capacitor C1.

As described above, in the third stage T23, the second clock signal SCK2 transitions to a high level in the sub-stage T231, and the second clock signal SCK2 transitions to a low level in the sub-stage T232. The eleventh transistor M11 is turned on, so that the second clock signal SCK2 periodically transitions from a high level to a low level, and the potential of the fifth node N5 is pulled down from a high level to a low level. Through a coupling of the first capacitor C1, the potential of the fourth node N4 is reduced. The thirteenth transistor M13 is turned on, so that a negative charge, coupled by the first capacitor C1 after the second clock signal SCK2 periodically transitions to a low level, is transmitted to the sixth node N6 through the thirteenth transistor M13.

Based on the above principle and the shift register structure shown in FIG. 8, An analysis process of the capacitance C21 of the second capacitor C2 and the capacitance C11 of the first capacitor C1 is as follows.

In the third stage T23, the fifteenth transistor M15 is turned on, and the first power signal vgl is transmitted to the shift output end GOUT via the fifteenth transistor M15. The potential VN4 of the fourth node N4 and the potential VN6 of the sixth node N6 satisfy formulas (1) and (2).

$$VN6 \approx VN4 \quad (1)$$

$$VN4 = vgl - Vtha \quad (2)$$

To ensure a smooth transmission of the first power signal vgl to the shift output end GOUT through the fifteenth transistor M15, and to ensure that the shift output end GOUT outputs vgl and avoids stage-to-stage transmission, when the second clock signal SCK2 transitions to a low level in the sub-stage T232, the potential VN6 of the sixth node N6 can be pulled down, and VN6 satisfies formula (3).

$$VN6 < vgl + Vthb \quad (3)$$

Vthb is a threshold voltage Vth of the fifteenth transistor M15.

The thirteenth transistor M13 can be designed as a diode. Therefore the potential VN6 of the sixth node N6 satisfies formula (4).

$$VN6 + Vthc = VN4 \quad (4)$$

Vthc is a threshold voltage Vth of the thirteenth transistor M13.

The second clock signal SCK2 undergoes periodic low transitions, and after being coupled by the first capacitor C1, a corresponding first coupling charge VSCK2 satisfies formula (5).

$$VSCK2=(Vgh-vgl)*C11 \quad (5)$$

The high level of the second clock signal SCK2 is Vgh, and the low level of the second clock signal SCK2 is vgl. It should be noted that the low level of the second clock signal SCK2, a low level of the first trigger signal VINA and the first power supply signal can be equal, that is, all are vgl, and the high level of the second clock signal SCK2, a high level of the first trigger signal VINA and the second power supply signal can be equal, that is, all are Vgh.

Based on formula (3), formula (6) can be obtained.

$$VN6+Vthc<vgl+Vthb+Vthc \quad (6)$$

Combining formula (4) and formula (6), formula (7) can be obtained.

$$VN4<vgl+Vthb+Vthc \quad (7)$$

Ignoring other parasitic capacitances, VSCK2 satisfies formula (8).

$$(Vgh-vgl)*C11>C21*(-Vtha-Vthb)-C11*(Vthb+Vthc+Vtha) \quad (8)$$

If $(-Vtha-Vthb)>0$, formula (9) can be obtained.

$$C21<(Vgh-vgl+Vtha+Vthb+Vthc)*C11/(-Vtha-Vthb) \quad (9)$$

Exemplarily, when Vgh=8V, Vgl=−8V, and Vtha=Vthb=Vthc=−3V, the condition C21<7*C11/6 (i.e., C21<1.16C11) must be satisfied. An overlapping area of two metal layers forming the second capacitor C2 cannot exceed 1.16 times an area of the first capacitor C1.

To account for process fluctuations, a threshold Vth>−4V is typically used, that is, a normal process limit for negative drift is set at Vth=−4V (i.e., Vtha=Vthb=Vthc=−4V). When Vgh=8V, Vgl=−8V, and Vtha=Vthb=Vthc=−4V, the condition C21<4*C11/8 (i.e., C21<0.5C11) must be satisfied. An overlapping area of two metal layers forming the second capacitor C2 cannot exceed 0.5 times of the area of the first capacitor C1.

Therefore, the capacitance C21 of the second capacitor may be greater than the capacitance C11 of the first capacitor, with C21=a*C11 where 1<a≤1.16. Alternatively, the capacitance C21 of the second capacitor may be less than the capacitance C11 of the first capacitor, with C21=b*C11 where 0<b≤0.5.

In one embodiment, the size of the first capacitor C1 and/or the size of the second capacitor C2 is adjusted so that the capacitance of the second capacitor C2 matches the capacitance of the first capacitor C1, and a charge coupled by the first capacitor C1 to the sixth node N6 can effectively lower the potential of the sixth node N6 in a timely manner, so that the output waveform at the shift output end GOUT can be quickly pulled down to the low voltage vgl, minimizing the falling edge of the output waveform at the shift output end GOUT, preventing the output signal of the shift output end GOUT from failing to reach vgl, improving an output stability of the gate driving circuit, and enhancing the display effect.

Figure 10:
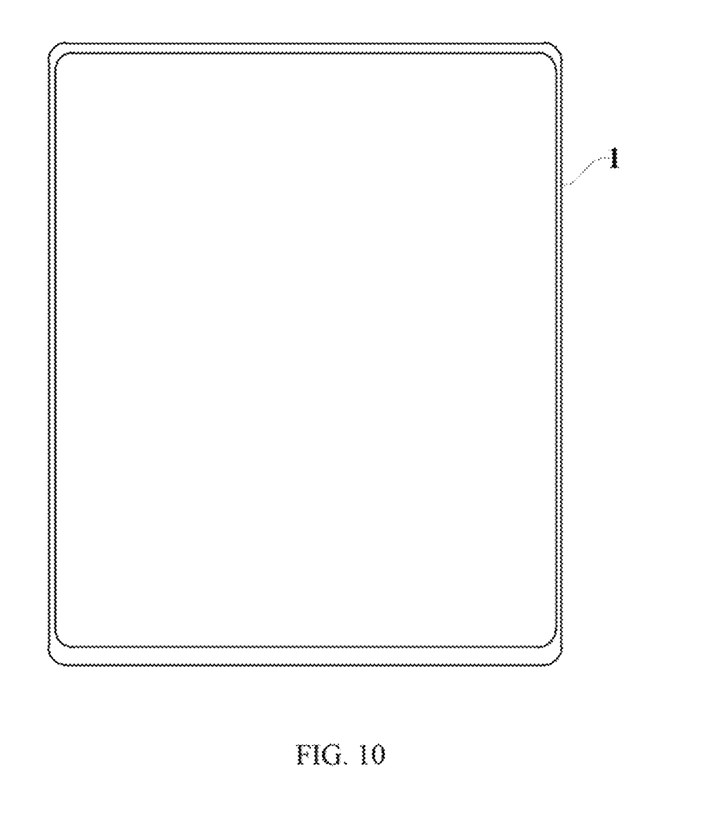
FIG. 10 illustrates a schematic diagram of a display device consistent with various embodiments of the present disclosure.

Based on a same inventive concept, in one embodiment, a display device is provided. FIG. 10 illustrates a schematic diagram of a display device consistent with various embodiments of the present disclosure. As shown in FIG. 10, the display device includes the display panel described in any embodiment of the present disclosure.

The display device can be utilized in a liquid crystal display device, an organic light-emitting display device, or a micro light-emitting diode display device, without specific limitation. The display device can serve as a display product for cars, a mobile display product or others, featuring both display and touch functions.

As shown in FIG. 10, the display device may be a smart phone, which includes a display panel that corresponds to the display panel described in any embodiment of the present disclosure.

In one embodiment, the display device has the functional modules and beneficial effects corresponding to the gate driving circuit described in any of the above embodiments. The display device can be applied to terminal devices such as smart phones, vehicle displays, tablet computers, notebook computers, super mobile personal computers, netbooks, smart wearable devices, augmented reality (AR)/virtual reality (VR) devices and the like.

Various forms of processes shown above can be used to reorder, add or delete steps. For example, the steps outlined in the present disclosure can be executed in parallel, sequentially or in different orders, if desired results of the technical solution are achieved, which is not limited herein.

As disclosed, the gate driving circuit, the display panel and the display device provided by the present disclosure at least realize the following beneficial effects.

The gate driving circuit includes a plurality of cascaded shift registers, and the shift register includes a first coupling module and a second coupling module. The first coupling module includes a first switch unit and a first capacitor. An output end of the first switch unit is connected to a fifth node, and the first capacitor is placed between, and connected to, the fifth node and a fourth node. The second coupling module includes a second capacitor, and the second capacitor is placed between, and connected to, the fourth node and a shift output end. A capacitance of the second capacitor differs from a capacitance of the first capacitor. In the present disclosure, in a shift register, the capacitance of the second capacitor must match the capacitance of the first capacitor, so as to ensure that a charge coupled by the first capacitor to the fourth node can lower a potential of the fourth node in a timely manner, minimizing a falling edge of an output waveform at the shift output end, preventing an abnormal output of the gate drive circuit, mitigating display abnormalities caused by small steps of a stage transmission of the gate drive circuit, and enhancing a display effect and circuit reliability.

The above specific implementations do not limit the protection scope of the present disclosure. A person skilled in the art should understand that various modifications, combinations, sub-combinations and substitutions can be made according to design requirements and other factors. Any modification, equivalent substitution and improvement made within the spirit and principles of the present disclosure should be included in the protection scope of the present disclosure.

What is claimed is:

1. A gate driving circuit, comprising a plurality of cascaded shift registers, wherein:
    a shift register of the plurality of shift registers includes an input module, a node control module, a first coupling module, a second coupling module and an output module;
    the input module is respectively connected to a first power supply end, a first clock end, a trigger signal end, a first node and a second node, and is configured to adjust potentials of the first node and the second node;

the node control module is respectively connected to the first node, the second node, the first power supply end, a second power supply end, the first clock end, a second clock end, a third node and a fourth node, and is configured to adjust potentials of the third node and the fourth node;

the first coupling module includes a first switch unit and a first capacitor, the first switch unit is respectively connected to the second clock end, the second power end and a fifth node, and the first capacitor is placed between, and connected to, the fifth node and the fourth node;

the second coupling module includes a second capacitor placed between, and connected to, the fourth node and a shift output end;

the output module is respectively connected to the third node, the fourth node, the first power supply end, the second power supply end and the shift output end, and is configured to control a signal at the shift output end; and a capacitance of the second capacitor differs from a capacitance of the first capacitor, wherein C21=a*C11, 1<a≤1.16, or C21=b*C11, 0<b≤0.5, C21 is the capacitance of the second capacitor and C11 is the capacitance of the first capacitor.

2. The gate driving circuit according to claim 1, wherein the capacitance of the second capacitor is greater than the capacitance of the first capacitor.

3. The gate driving circuit according to claim 1, wherein the capacitance of the second capacitor is smaller than the capacitance of the first capacitor.

4. The gate driving circuit according to claim 1, wherein a first control end of the first switch unit is connected to the first node, a second control end of the first switch unit is connected to the fourth node, a first input end of the first switch unit is connected to the second power end, and a second input end of the first switch unit is connected to the second clock end, and an output end of the first switch unit is connected to the fifth node.

5. The gate driving circuit according to claim 4, wherein:
the first switch unit includes an eleventh transistor and a twelfth transistor;
a gate of the eleventh transistor is connected to the fourth node, and the eleventh transistor is placed between, and connected to, the second clock end and the fifth node; and
a gate of the twelfth transistor is connected to the first node, and the twelfth transistor is placed between, and connected to, the second power supply end and the fifth node.

6. The gate driving circuit according to claim 1, wherein:
the second coupling module includes a second switch unit, a control end and an input end of the second switch unit are both connected to the fourth node, and an output end of the second switch unit is connected to a sixth node; and
the second capacitor is placed between, and connected to, the sixth node and the shift output end.

7. The gate driving circuit according to claim 6, wherein:
the second switch unit includes a thirteenth transistor; and
a gate of the thirteenth transistor is connected to the fourth node, and the thirteenth transistor is placed between, and connected to, the fourth node and the sixth node.

8. The gate driving circuit according to claim 1, wherein:
the input module includes a first transistor and a second transistor;

a gate of the first transistor is connected to the first clock end, and the first transistor is placed between, and connected to, the first power supply end and the first node; and a gate of the second transistor is connected to the first clock end, and the second transistor is placed between, and connected to, the trigger signal end and the second node.

9. The gate driving circuit according to claim 8, wherein:
the input module further includes a third transistor; and
a gate of the third transistor is connected to the first clock end, and the third transistor is placed between, and connected to, the trigger signal end and the second node.

10. The gate driving circuit according to claim 1, wherein:
the node control module includes a fourth transistor, a fifth transistor, a sixth transistor, a seventh transistor, an eighth transistor, a ninth transistor and a third capacitor;
a gate of the fourth transistor is connected to the second node, and the fourth transistor is placed between, and connected to, the first clock end and the first node;
a gate of the fifth transistor is connected to the first power supply end, and the fifth transistor is placed between, and connected to, the first node and a first end of the third capacitor;
a gate of the sixth transistor is connected to the first end of the third capacitor, and the sixth transistor is placed between, and connected to, a second end of the third capacitor and the second clock end;
a gate of the seventh transistor is connected to the second clock end, and the seventh transistor is placed between, and connected to, the second end of the third capacitor and the third node;
a gate of the eighth transistor is connected to the second node, and the eighth transistor is placed between, and connected to, the second power supply end and the third node; and
a gate of the ninth transistor is connected to the first power supply end, and the ninth transistor is placed between, and connected to, the second node and the fourth node.

11. The gate driving circuit according to claim 10, wherein:
the node control module includes a tenth transistor;
a gate of the tenth transistor is connected to the first power supply end, and the tenth transistor is placed between, and connected to, the second node and a sixth node; and
the sixth node is connected to the shift output end through the second capacitor.

12. The gate driving circuit according to claim 10, wherein the fourth transistor is a dual-gate transistor.

13. The gate driving circuit according to claim 1, wherein:
the output module includes a fourteenth transistor, a fifteenth transistor and a fourth capacitor;
a gate of the fourteenth transistor is connected to the third node, and the fourteenth transistor is placed between, and connected to, the second power supply end and the shift output end;
the fourth capacitor is placed between, and connected to, the third node and the second power supply end; and
a gate of the fifteenth transistor is connected to the shift output end through the second capacitor, and the fifteenth transistor is placed between, and connected to, the first power supply end and the shift output end.

14. The gate driving circuit according to claim 1, wherein:
the first clock end provides a first clock signal, and the second clock end provides a second clock signal; and the first clock signal and the second clock signal have opposite phases.

15. The gate driving circuit according to claim 1, wherein a trigger signal end of the shift register at n-th level is connected to a shift output end of the shift register at (n−m)-th level, m and n are both positive integers, where m≥1, and n≥2.

16. A display panel comprising a gate driving circuit, the gate driving circuit comprising a plurality of cascaded shift registers, wherein:
a shift register of the plurality of shift registers includes an input module, a node control module, a first coupling module, a second coupling module and an output module;
the input module is respectively connected to a first power supply end, a first clock end, a trigger signal end, a first node and a second node, and is configured to adjust potentials of the first node and the second node;
the node control module is respectively connected to the first node, the second node, the first power supply end, a second power supply end, the first clock end, a second clock end, a third node and a fourth node, and is configured to adjust potentials of the third node and the fourth node;
the first coupling module includes a first switch unit and a first capacitor, the first switch unit is respectively connected to the second clock end, the second power end and a fifth node, and the first capacitor is placed between, and connected to, the fifth node and the fourth node;
the second coupling module includes a second capacitor placed between, and connected to, the fourth node and a shift output end;
the output module is respectively connected to the third node, the fourth node, the first power supply end, the second power supply end and the shift output end, and is configured to control a signal at the shift output end; and
a capacitance of the second capacitor differs from a capacitance of the first capacitor,
wherein C21=a*C11, 1<a≤1.16, or C21=b*C11, 0<b≤0.5, C21 is the capacitance of the second capacitor and C11 is the capacitance of the first capacitor.

17. The display panel according to claim 16, wherein a first control end of the first switch unit is connected to the first node, a second control end of the first switch unit is connected to the fourth node, a first input end of the first switch unit is connected to the second power end, and a second input end of the first switch unit is connected to the second clock end, and an output end of the first switch unit is connected to the fifth node.

18. A display device comprising a display panel, the display panel comprising a gate driving circuit, the gate driving circuit comprising a plurality of cascaded shift registers, wherein:
a shift register of the plurality of shift registers includes an input module, a node control module, a first coupling module, a second coupling module and an output module;
the input module is respectively connected to a first power supply end, a first clock end, a trigger signal end, a first node and a second node, and is configured to adjust potentials of the first node and the second node;
the node control module is respectively connected to the first node, the second node, the first power supply end, a second power supply end, the first clock end, a second clock end, a third node and a fourth node, and is configured to adjust potentials of the third node and the fourth node;
the first coupling module includes a first switch unit and a first capacitor, the first switch unit is respectively connected to the second clock end, the second power end and a fifth node, and the first capacitor is placed between, and connected to, the fifth node and the fourth node;
the second coupling module includes a second capacitor placed between, and connected to, the fourth node and a shift output end;
the output module is respectively connected to the third node, the fourth node, the first power supply end, the second power supply end and the shift output end, and is configured to control a signal at the shift output end; and
a capacitance of the second capacitor differs from a capacitance of the first capacitor,
wherein C21=a*C11, 1<a≤1.16, or C21=b*C11, 0<b≤0.5, C21 is the capacitance of the second capacitor and C11 is the capacitance of the first capacitor.

* * * * *